United States Patent
Luan et al.

(10) Patent No.: US 10,180,803 B2
(45) Date of Patent: Jan. 15, 2019

(54) INTELLIGENT MEMORY ARCHITECTURE FOR INCREASED EFFICIENCY

(71) Applicant: Futurewei Technologies, Inc., Plano, TX (US)

(72) Inventors: Hao Luan, Plano, TX (US); Alan Gatherer, Richardson, TX (US); Sriram Vishwanath, Austin, TX (US); Casen Hunger, Austin, TX (US); Hardik Jain, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 327 days.

(21) Appl. No.: 14/810,895

(22) Filed: Jul. 28, 2015

(65) Prior Publication Data

US 2017/0031619 A1   Feb. 2, 2017

(51) Int. Cl.
  *G06F 12/00* (2006.01)
  *G06F 13/00* (2006.01)
  *G06F 3/06* (2006.01)

(52) U.S. Cl.
  CPC .......... *G06F 3/0622* (2013.01); *G06F 3/0611* (2013.01); *G06F 3/0653* (2013.01); *G06F 3/0659* (2013.01); *G06F 3/0673* (2013.01); *G06F 3/0688* (2013.01)

(58) Field of Classification Search
  CPC ............. G06F 13/1663; G06F 13/1684; G06F 13/1657; G06F 12/0815; G06F 2212/283; G11C 7/1072
  See application file for complete search history.

(56) References Cited

U.S. PATENT DOCUMENTS

| | | | |
|---|---|---|---|
| 6,757,791 | B1 | 6/2004 | O'Grady et al. |
| 6,877,077 | B2 | 4/2005 | McGee et al. |
| 2004/0128428 | A1 | 7/2004 | Christenson |
| 2005/0091460 | A1 | 4/2005 | Rotithor et al. |
| 2007/0156946 | A1 | 7/2007 | Lakshmanamurthy et al. |
| 2007/0168700 | A1 | 7/2007 | Dickenson et al. |

(Continued)

FOREIGN PATENT DOCUMENTS

| | | |
|---|---|---|
| CN | 101132336 A | 2/2008 |
| CN | 101196857 | 6/2008 |

(Continued)

OTHER PUBLICATIONS

"International Application Serial No. PCT/CN2016/092030, International Search Report dated Nov. 1, 2016", 4 pgs.

(Continued)

*Primary Examiner* — Sean D Rossiter
(74) *Attorney, Agent, or Firm* — Schwegman Lundberg & Woessner, P.A.

(57) ABSTRACT

A method includes receiving a first request, from a first master core, to access data in one of a plurality of memory banks. It is determined whether an access to the data is stalled by virtue of a second request, from a second master core, to access the data in the one of the plurality of memory banks, the second request currently being serviced. In response to a determination that the access to the requested data is stalled, the first request is serviced by accessing data in one of a plurality of coding banks, each coding bank smaller in size than each memory bank.

9 Claims, 12 Drawing Sheets

(56) References Cited

U.S. PATENT DOCUMENTS

| | | |
|---|---|---|
| 2007/0168702 A1 | 7/2007 | Dickenson et al. |
| 2008/0126682 A1* | 5/2008 | Zhao .................. G06F 3/0613 |
| | | 711/103 |
| 2009/0100236 A1 | 4/2009 | Puig |
| 2009/0138670 A1* | 5/2009 | Mutlu ................ G06F 13/1663 |
| | | 711/167 |
| 2009/0300320 A1 | 12/2009 | Zhang |
| 2011/0022791 A1 | 1/2011 | Iyer et al. |
| 2011/0179200 A1* | 7/2011 | Sukonik ............. G06F 13/1626 |
| | | 710/53 |
| 2011/0179240 A1* | 7/2011 | Sukonik ................ G06F 13/18 |
| | | 711/158 |
| 2011/0238941 A1* | 9/2011 | Xu ..................... G06F 13/1689 |
| | | 711/169 |
| 2012/0079318 A1 | 3/2012 | Colgrove et al. |
| 2012/0084506 A1 | 4/2012 | Colgrove et al. |
| 2012/0127818 A1 | 5/2012 | Levy |
| 2013/0297907 A1 | 11/2013 | Ki et al. |
| 2014/0047197 A1* | 2/2014 | Kokrady ................. G11C 8/16 |
| | | 711/149 |
| 2014/0059301 A1 | 2/2014 | Rao |
| 2014/0177731 A1* | 6/2014 | Limberg ........... H03M 13/1515 |
| | | 375/240.25 |
| 2014/0223223 A1 | 8/2014 | Akutsu |
| 2014/0310482 A1 | 10/2014 | Iyer et al. |
| 2016/0328158 A1* | 11/2016 | Bromberg ............ G06F 3/0611 |
| 2017/0031606 A1* | 2/2017 | Luan ..................... G06F 3/0611 |
| 2017/0153824 A1* | 6/2017 | Luan ..................... G06F 3/0611 |
| 2017/0315738 A1* | 11/2017 | Arsovski .............. G06F 3/0619 |

FOREIGN PATENT DOCUMENTS

| | | |
|---|---|---|
| CN | 101436150 | 5/2009 |
| CN | 102460376 A | 5/2012 |
| CN | 103077123 A | 5/2013 |
| EP | 2717186 | 4/2014 |
| KR | 2013-0104937 A | 9/2013 |
| WO | WO-00/29959 A1 | 5/2000 |
| WO | WO-2010/151267 A1 | 12/2010 |
| WO | WO-2014/084855 A1 | 6/2014 |

OTHER PUBLICATIONS

"International Application No. PCT/CN2015/098231, International Search Report and Written Opinion dated Aug. 24, 2016", (Aug. 24, 2016), 12 pgs.

"U.S. Appl. No. 14/955,966, Non-Final Office Action dated Mar. 22, 2018", (Mar. 22, 2018), 15 pgs.

"European Application Serial No. 16829854.5, Supplementary European Search Report dated May 28, 2018", 8 pgs.

"European Applicaton Serial No. 16829867.7, Supplemental European Search Report dated Jun. 4, 2018", 9 pgs.

"European Applicaton Serial No. 16829868.5, Supplemental European Search Report dated Jun. 6, 2018", 10 pgs.

"European Application Seriial No. 15909601.5, Extended European Search Report dated Sep. 28, 2018", 9 pgs.

\* cited by examiner

INTELLIGENT MEMORY ARCHITECTURE FOR INCREASED EFFICIENCY

BACKGROUND

Memory accesses are a vital part of program execution in a computer system. Generally, one or more processors (such as central processing units (CPUs), graphics processing units (GPUs), Digital Signal Processors (DSPs), Hardware Accelerators (HACs), or other processors) access various memory banks via a memory controller. Recent years have seen the rise of multi-core processors, where a memory controller controls access to the memory banks from multiple different processors or cores (also called master processors). As processor speed and number of processors increase, however, there has not been a proportional increase in the access speed to memory. Specifically, when multiple processors attempt to access the same memory bank at or near the same time, one of the processors waits while the request from the other processor is serviced. As the number of processors increases, the number of accesses and potentially conflicting accesses also increases, keeping memory access time degraded.

DETAILED DESCRIPTION

In the following description, reference is made to the accompanying drawings, which form a part hereof, and in which are shown by way of illustration specific embodiments which may be practiced. These embodiments are described in sufficient detail to enable those skilled in the art to practice the subject matter disclosed herein, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software or a combination of software and human-implemented procedures in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system.

In an example embodiment, memory access efficiency of multiple processors is increased by increasing parallelism using additional redundant memory banks. An intelligent memory system is enhanced by adding redundancy of stored data in a coded format. Access conflicts from various processors (also called "masters") may be reduced via the use of one or more additional memory banks referred to as coding banks. The additional data stored may be stored in a compressed format in the coding banks to create redundancy for stored data while minimizing additional storage space as well as access overhead. The redundant data may be used to normalize access to memory banks, thus increasing the overall efficiency of the system.

Figure 1:
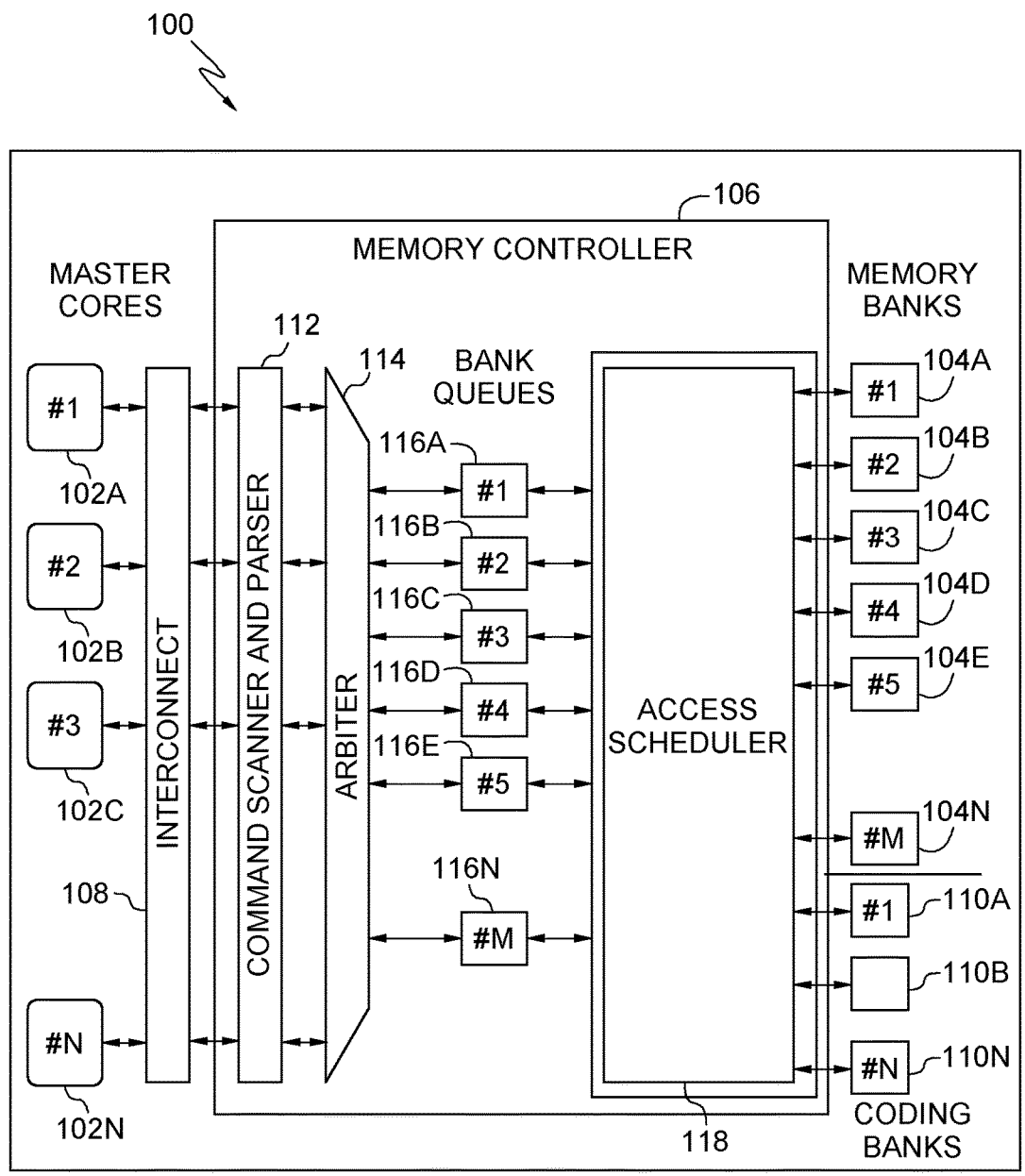
FIG. 1 is a block diagram illustrating a system for controlling memory accesses, in accordance with an example embodiment.

FIG. 1 is a block diagram illustrating a system 100 for controlling memory accesses in accordance with an example embodiment. The system 100 includes a plurality of master cores 102A-102N. Each master core 102A-102N may be a processor. In an example embodiment, each master core 102A-102N is implemented as a master core processor means. In some example embodiments, all of the master cores 102A-102N operate on a single chip and may be thought of as multiple cores of a single processor. In other example embodiments, these master cores 102A-102N may be located across multiple chips or circuits. Regardless of the architecture, access to memory banks 104A-104N is controlled by a memory controller 106. It should be noted that in some example embodiments there are actually multiple memory controllers 106, where each memory controller 106 controls disjoint memory banks.

The master cores 102A-102N communicate with the shared memory controller 106 over interconnect 108. Interconnect may be implemented with one or more busses, one or more networks (such as a packet-switched network), or some combination of busses and networks. The bus width of various busses in interconnect 108 may or may not be the same as the other busses. For example, some busses in the interconnect may be 128 bits wide, whereas others are 256 bits wide. Thus, one master core 102A-102N may communicate on a 128 bus, whereas another master communicates on a 256 bit bus, as one example. Note that the shared memory controller 106 may be directly connected to one or more of the master cores 102A-102N, as one possibility. Also, the various busses and networks in interconnect 108 may observe the same or different protocols. In one example embodiment, one or more of the master cores 102A-102N are configured with a point-to-point direct connection to the shared memory controller 106. This can help to achieve high performance when using embodiments of beat-level arbitration.

In FIG. 1, all master cores 102A-102N, shared memory including data banks 104A-104N and coding banks 110A-110N, and shared memory controller 106, can be clocked at a common frequency, or can be clocked independently. Also, the master cores 102A-102N shared memory including data banks 104A-104N and coding banks 110A-110N, and shared memory controller 106, can be clocked synchronously or asynchronously. If clocked synchronously, the clock speeds for shared memory including data banks 104A-104N and coding banks 110A-110N and shared memory controller 106 are proportional to the clock speed for the master cores 102A-102N. Additionally, each can be clocked at a different frequency, and with different clock phase if clocked asynchronously. For example, in one example embodiment, assume master cores 102A-102N are clocked at a frequency F. Shared memory including data banks 104A-104N and coding banks 110A-110N and shared memory controller 106 may be clocked at ½ F. In another example embodiment, shared memory including data banks 104A-104N may be clocked at ¼ F and coding banks 110A-110N may be clocked at ½ F, while shared memory controller 106 is clocked at ¼ F. The clock speeds for a particular embodiment can be traded off between performance and power, as over-clocking a device generally wastes power and under-clocking introduces latency.

Command (read and write) scanner and parser takes 112 takes all the read and write commands from all master cores 102A-102N and puts every command into arbiter 114 based on their target address. In an example embodiment, arbiter 114 is an arbiter means.

The memory controller 106 is divided into four parts: the aforementioned command scanner and parser 112, the aforementioned arbiter 114, a plurality of bank queues 116A-116N, and an access scheduler 118. The arbiter 114 is responsible for interaction with the master cores 102A-102N. It mainly arbitrates requests from the master cores 102A-102N and is responsible for handshaking between the master cores 102A-102N and the memory controller 106. It should be noted that while a single arbiter 114 is depicted, in some example embodiments there are a plurality of arbiters 114 that correspond to the number of banks/queues and in other example embodiments there is one arbiter 114 for reads and another arbiter 114 for writes. The bank queues 116A-116N are used to hold requests to be served for a particular memory bank 104A-104N. In an example embodiment, each bank queue 116A-116N corresponds to a particular memory bank 104A-104N. When an access to a particular memory bank (e.g., memory bank 104B) is received, it is placed in the corresponding bank queue (e.g., bank queue 116B) until it can be serviced. It should be noted that the term "serviced" as used in this disclosure is intended to describe the process by which a particular request is handled by a processor. This handling will typically involve removal of the request from a queue (if appropriate), determining data responsive to the request, obtaining the data responsive to the request, and forming and sending a response to the request.

It should also be noted that, while a single bank queue 116A-116N corresponding to each bank queue 116A-116N is shown in this figure, in an example embodiment, each bank queue 116A-110N actually comprises a read queue and a write queue. The read queue holds requests to read from the corresponding memory bank 104A-104N, while the write queue holds requests to write to the corresponding memory bank 104A-104N.

The access scheduler 118 forms an access pattern for each memory cycle. It is also responsible for the handshake between the memory controller 106 and the memory banks 104A-104N, as well as coding banks 110A-110N, as will be described in more detail below. In an example embodiment, the access scheduler 118 is an accessing scheduler means.

The coding banks 110A-110N are extra banks used to store copies of some of the data in the memory banks 104A-104N. In an example embodiment, these copies are stored in compressed form using a specialized encoding scheme. The access scheduler 118 is designed to create an enhanced access schedule that utilizes the coding banks 110A-110N to increase access efficiency. It should be noted that codes are generally stored in the coding banks 110A-110N (separate from the data banks), however, they can be held in the data banks also depending upon the coding scheme. In other words, in an example embodiment there is a coding scheme where codes are stored in data banks and interleaved. Thus, for purposes of this disclosure, the notion of a coding bank is a construct that could also be contained in a data bank using the right coding scheme.

In an example embodiment, each coding bank 110A-110N is smaller than any of the memory banks 104A-104N. This leads to efficient use of the additional memory needed to utilize the coding banks 110A-110N, thus minimizing the amount of additional memory needed. This is in contrast to a solution that, for example, would simply provide full coding coverage of every memory bank 104A-104N.

In an example embodiment, each coding bank 110A-110N is reserved for the efficient coding of existing data from a memory bank 104A-104N. Traditionally, when multiple accesses to a single memory bank 104A-104N are issued by one or more of the master cores 102A-102N, a stall is generated. These stalls are known as bank conflicts, and result from the fact that only one address from a particular memory bank 104A-104N can be accessed at a time. In an example embodiment, the coding banks 110A-110N are accessed concurrently with the corresponding memory banks 104A-104N to help alleviate stalls from bank conflicts.

The precise functioning of the encoding of the coding banks 110A-110N may vary based on the memory bank 104A-104N size and the coding bank 110A-110N size.

In an example embodiment, an Exclusive OR (XOR) function is used to store data in the coding banks 110A-110N. This acts to reduce complexity overhead and preserve the linearity of codes. Linear codes offer the widest range of functionality because any order of the codes may be used to either encode or decode. The lack of dependency allows the design to use the coding banks 110A-110N in the most flexible way possible. Additionally, in an example embodiment, different weights can be assigned to the memory elements for the XOR function. For example, memory elements $a_0$ and $b_0$ could be stored as $\alpha a_0 + \beta b_0$ for integer values $\alpha$ and $\beta$ which belong to any Galois field. Another design consideration could be the compression factor to generate the codes. The XOR can be performed on 2 or more memory elements, and thus the greater the number of memory elements that the XOR is performed on, the greater the compression factor (and the greater the complexity in decoding the code). For example, suppose there are four memory banks A, B, C, and D, holding elements $a_0$ to $a_n$, $b_0$ to $b_n$, $c_0$ to $c_n$, and $d_0$ to $d_n$, respectively. The possible codes corresponding to these elements in the coding banks could be $$a_i+b_i; b_i+c_i; c_i+d_i; \text{ and } c_i+a_i \text{ for } i=0 \text{ to } n.$$

It should be noted that the "+" sign as used herein means to perform one or more functions in conjunction with the one or more data involved.

This scheme uses a combination of 2 memory elements to generate the codes. Although this uses 100% extra memory overhead, it also enables 100% extra memory accesses per cycle (i.e. 4 extra accesses). Another design could be to compress the codes by combining all 4 memory elements to generate the codes:

$$a_i+b_i+c_i+d_i \text{ for } i=0 \text{ to } n.$$

This design gives one extra access per cycle at the cost of 25% memory overhead. However, the decoder here needs to obtain 3 elements in order to be able to decode the 4th element. So although more data could be compressed in a single memory location, this compression comes with the cost of additional access time and complexity. The scheme described above "codes" the coding banks 110A-110N using elements from different memory banks 104A-104N. This may be called "Interbank Coding." In an example embodiment, an orthogonal way of coding is provided called "Intrabank Coding," where memory elements from the same banks are used to generate codes. Additionally, embodiments are foreseen where both Interbank and Intrabank Coding are used.

Figure 2:
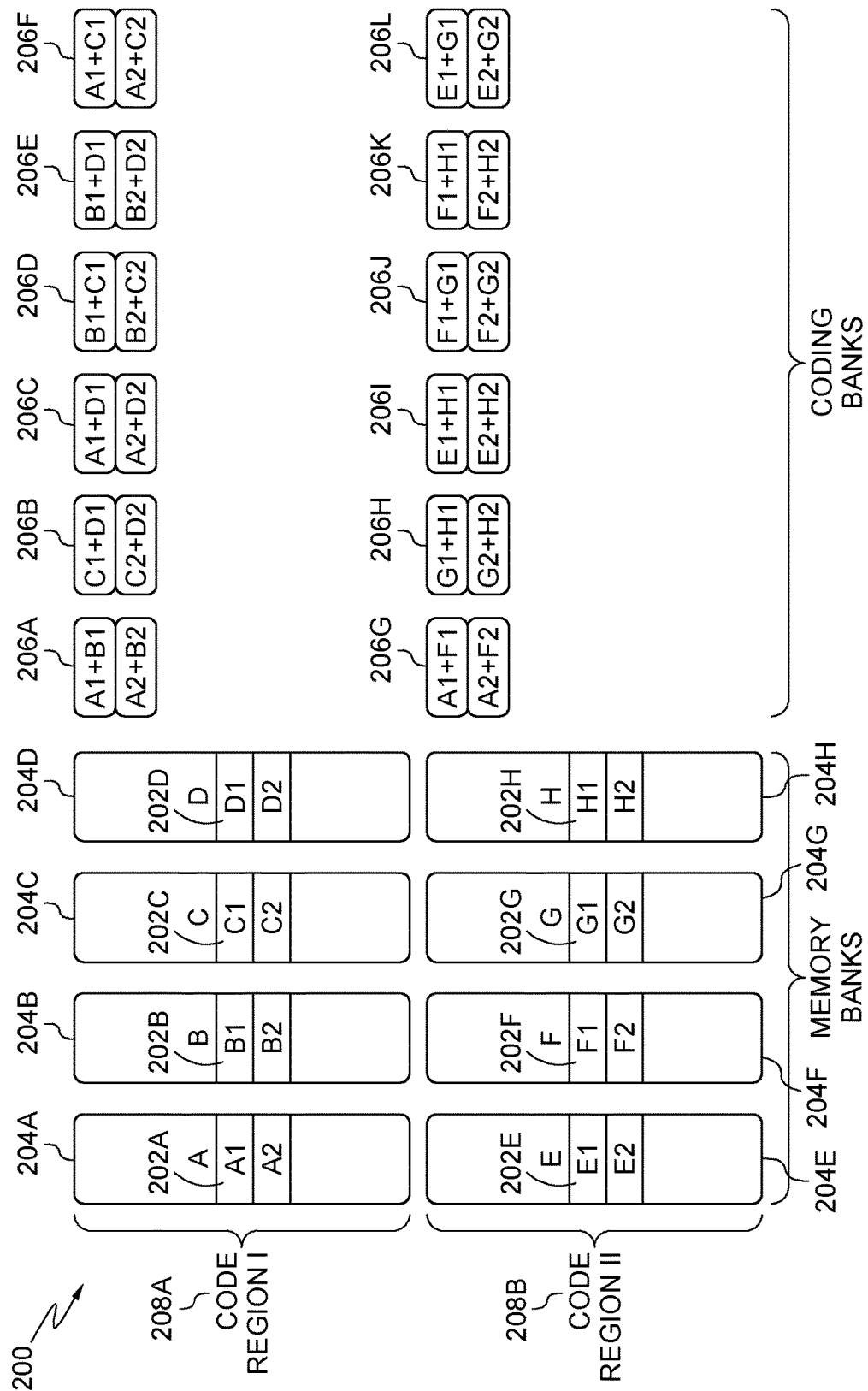
FIG. 2 is a block diagram depicting an interbank coding scheme, in accordance with an example embodiment.

FIGS. 2-5 are block diagrams depicting different coding schemes in accordance with an example embodiment. FIG. 2 is a block diagram depicting an interbank coding scheme 200 in accordance with an example embodiment. This design uses the concept of batch codes to code specific rows of memory 202A-202H within memory banks 204A-204H and store these codes in coding banks 206A-206L. This allows multiple accesses to the coded region to be served using the coding banks 206A-206L. With this scheme, a maximum of 4 read requests to a given coded region can be served at any time. As can be seen in FIG. 2, the memory banks 204A-204H are divided into two regions 208A, 208B. Each region 208A, 208B is assigned 4 of the memory banks 204A-204H. Each region 208A, 208B is also assigned half of the coding banks 206A-206L.

This coding scheme is designed to achieve maximum performance when sequential accesses to the coded regions are issued. During the best case access, up to 10 parallel accesses can be achieved in one cycle. Consider the scenario if a memory controller receives accesses to $a_1$; $b_1$; $c_1$; $d_1$; $a_2$; $b_2$; $c_2$; $d_2$; $c_3$; $d_3$. Here, $a_1$; $b_1$; $c_1$; $d_1$ can be served using $a_1$ from the memory bank 204A with the coding banks 206A, 206D, 206B ($a_1+b_1$; $b_1+c_1$; $c_1+d_1$, respectively), and $a_2$; $b_2$; $c_2$; $d_2$ can be served using $b_2$ from the memory bank 204B and $a_2+d_2$; $b_2+d_2$; $a_2+c_2$ from the coding banks 206C 206E, and 206F, respectively. Lastly, $c_3$ and $d_3$ can be served using the memory banks 204C and 204D, respectively.

In the worst-case scenario, this code scheme falls to 4 accesses in a cycle when there are non-sequential and non-consecutive accesses to the memory banks 204A-204H. For example, assume there are requests for $a_1$, $b_8$, $c_9$, and $d_{15}$. Since a code for this combination is not present in the coding banks 206A-206L, the benefit of parallel access is unused. However, a prefetching mechanism can be used to look ahead in the bank queue and prefetch codes from the coding banks 206A-206L for subsequent access.

Figure 3:
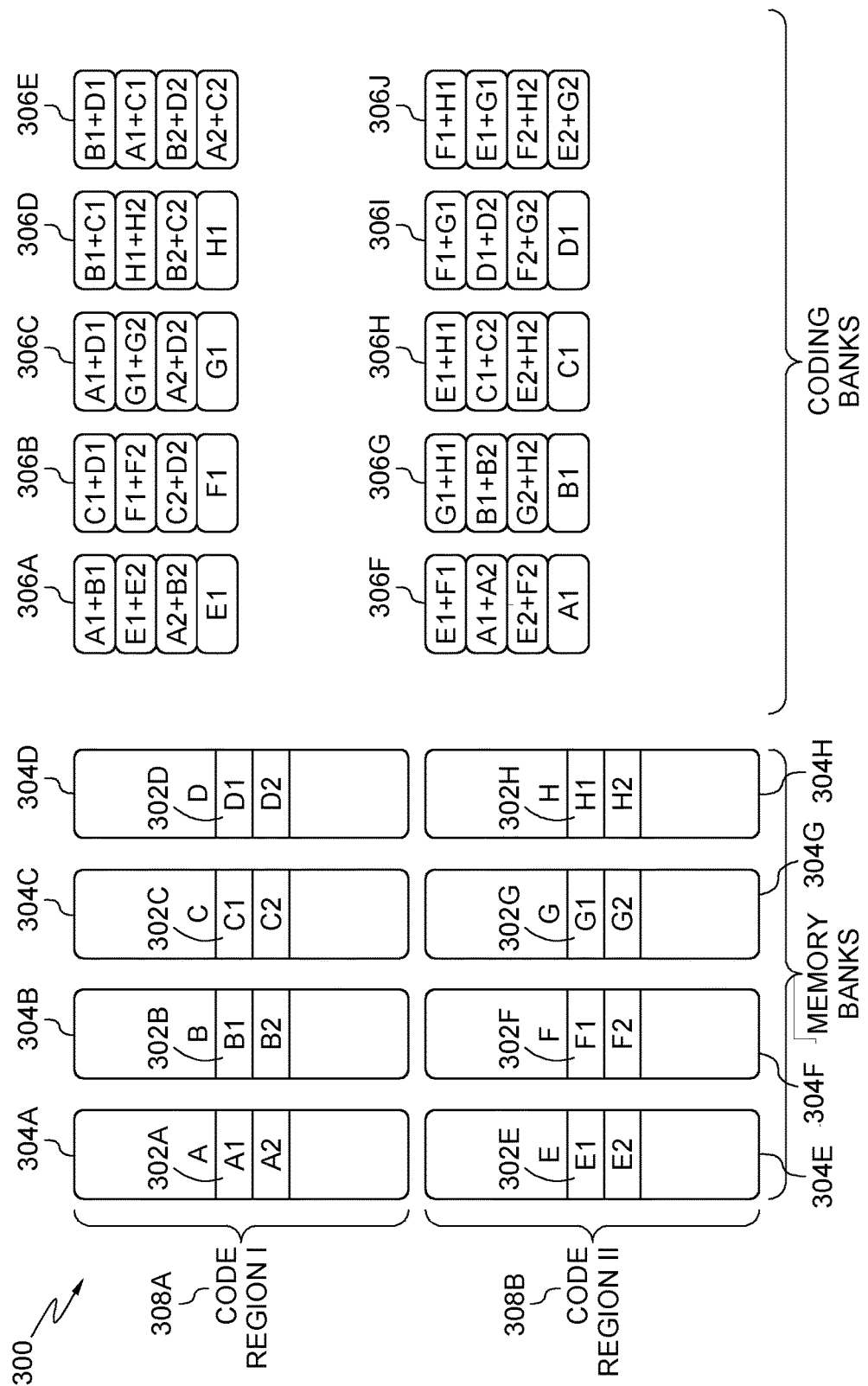
FIG. 3 is a block diagram depicting a combination of an interbank coding scheme and an intrabank coding scheme, in accordance with an example embodiment.

FIG. 3 is a block diagram depicting a combination of an interbank coding scheme and an intrabank coding scheme 300 in accordance with an example embodiment. This design allows a maximum of 5 read accesses per memory bank per cycle. As with FIG. 2, FIG. 3 uses the concept of batch codes to code specific rows of memory 302A-302H within memory banks 304A-304H and store these codes in coding banks 306A-306J. Notably, this design also mixes data from two regions 308A, 308B among the coding banks 306A-306J, so the coding banks 306A-306J are not split into regions. The data in this scheme is coded using both interbank and intrabank codes. The intrabank codes are stored in the coding banks 306A, 306B. This allows usage of the coding banks 306A-306J from the different regions 308A, 308B, if available.

This design provides maximum performance when sequential accesses to the coded regions are issued. In a best-case scenario, up to 11 parallel accesses can be achieved in one cycle. Consider the scenario if the memory controller receives accesses to $a_1$; $b_1$; $c_1$; $d_1$; $a_2$; $b_2$; $c_2$; $d_2$; $a_3$; $b_3$; $c_3$, $d_3$. Here, $a_1$; $b_1$; $c_1$; $d_1$ can be served using $a_1$ from the memory bank 306F and using $b_1$ from memory bank 306G with the coding banks 306D, 306B ($b_1+c_1$; $c_1+d_1$), and $a_2$; $b_2$; $d_2$ can be served using $b_2$ from the memory bank 304B with the coding banks 306C ($a_2+d_2$) and 306E ($b_2+d_2$). Lastly, $a_3$, $c_2$ and $d_3$ can be served using the memory banks 304A, 304C and 304D. In this case, 11 our of 12 requests are served in one clock cycle.

This code scheme can perform a maximum of 5 read accesses in a cycle for one data bank in the coded region. These are non-sequential and non-consecutive accesses to the memory banks 304A-304H. For example, when the access pattern is $d_1$; $d_6$; $d_9$; $d_{15}$; $d_{20}$, it may read $d_1$ from bottom coding banks in code region II where it has stored $d_1$, $d_6$ from the original data bank in code region I; read $a_9$ and $a_9+d_9$ to get $d_9$; read $b_{15}$ and $b_{15}+d_{15}$ to get $d_{15}$; and read $c_{20}$ and $c_{20}+d_{20}$ to get $d_{20}$ all from Code Region I and its associated coding banks. The prefetching mechanisms can be used to look ahead in the queue and prefetch codes from the coding banks 306A-306J for further accesses.

Figure 4:
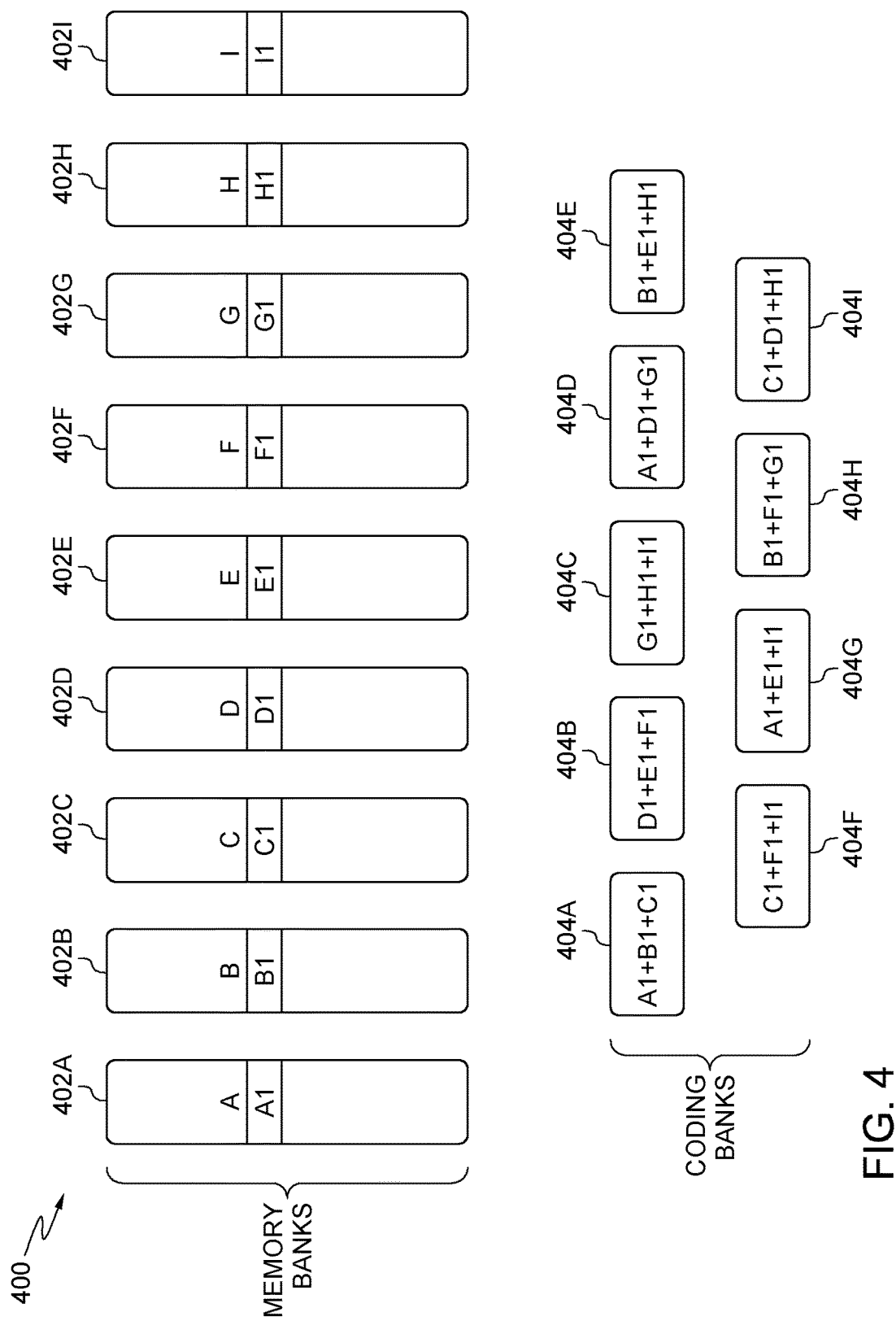
FIG. 4 is a block diagram depicting an interbank coding scheme, in accordance with an alternative example embodiment.

FIG. 4 is a block diagram depicting an interbank coding scheme 400 in accordance with an alternative example embodiment. Here, 9 memory banks 402A-402I and 9 coding banks 404A-404I are used. The coding scheme 400 also has a comparatively higher locality of 3. This means that the memory controller may obtain two out of three data elements to decode the third. This also allows for a maximum of simultaneous read accesses per bank per cycle and 2 simultaneous write accesses per bank per cycle. The memory overhead is less than in the previous designs, but there is higher logical complexity because of the increased locality.

Figure 5:
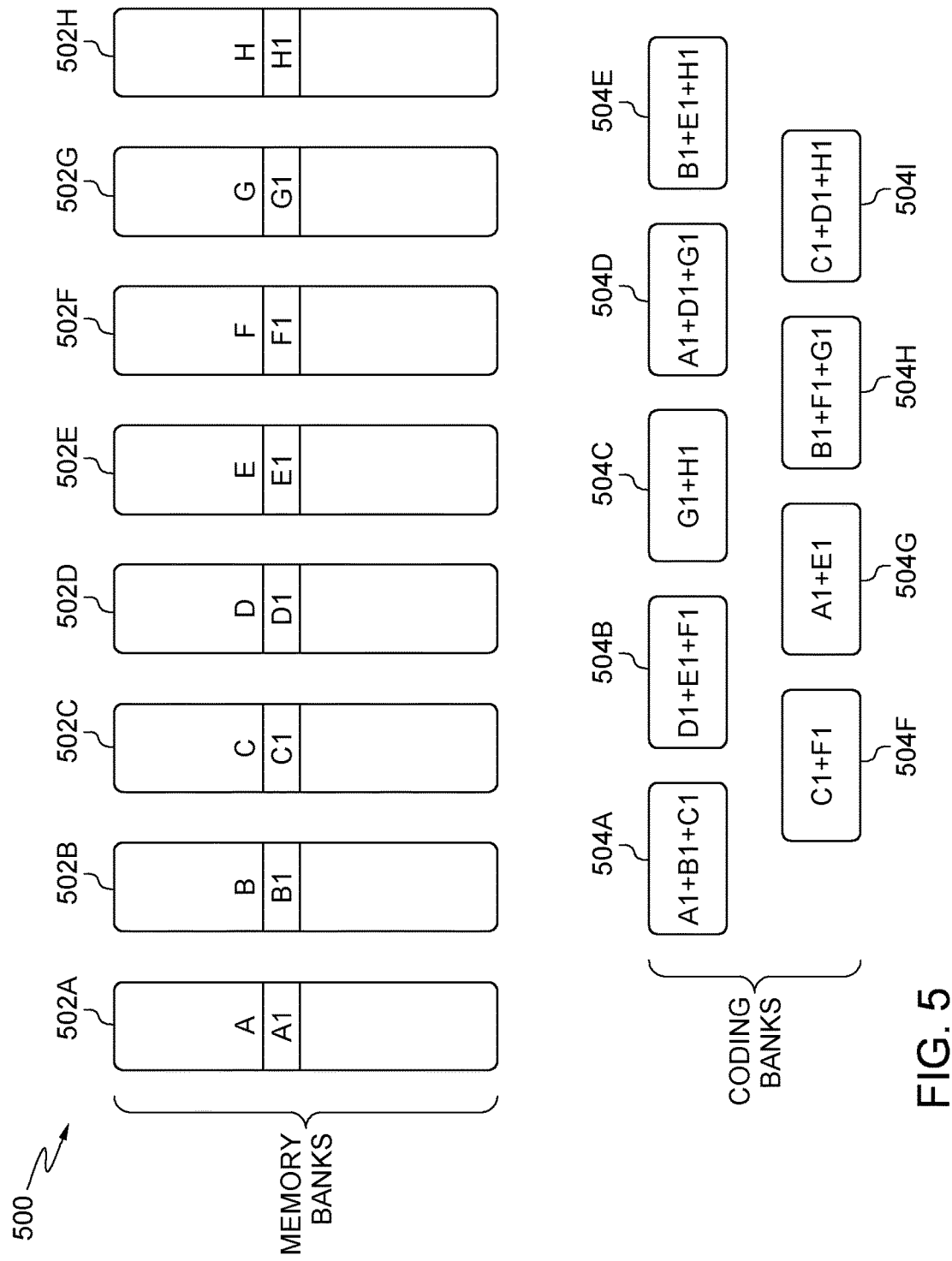
FIG. 5 is a block diagram depicting an interbank coding scheme, in accordance with another alternative example embodiment.

In some example embodiments, it may be desired to keep the number of banks $2^n$ for some integer n. In light of this, a 9-bank design may not be desirable. FIG. 5 is a block diagram depicting an interbank coding scheme 500 in accordance with another alternative example embodiment. Here, there are 8 memory banks 502A-502H rather than 9. Codes can be achieved by reducing the non-binary codes. There are 9 coding banks 504A-504I. Three of the coding banks, specifically the coding banks 504C, 504F, 504G, have a locality of 2, while the remaining coding banks 504A, 504B, 504D, 504E, 504H, and 504I have a locality of 3.

Referring back to FIG. 1, the arbiter 114 is responsible for handling requests from the master cores 102A-102N. The access scheduler 108 schedules the most efficient access for each cycle.

The arbiter 114 maintains a queue for each of the master cores 102A-102N. The depth of each queue may be fixed (e.g., 8 requests). When a queue is filled up, the memory controller 106 signals the respective master core 102A-102N that it is busy, so the master core 102A-102N cannot issue another memory request and hence stalls until the memory controller 106 indicates that the queue has room to accommodate requests. The arbiter 114 is also responsible for arbitration among the requests from the master cores 102A-102N. The arbiter 114 goes through all elements of each queue and determines a priority order. It can use a two-step priority order mechanism: first it arranges the requests in order of Quality of Service (QoS), with high QoS at high priority; second, for requests having the same priority, it arranges them using a round robin or similar ordering scheme. It should be noted that these functions described for the arbiter 114 may actually be performed by a core arbiter portion of the arbiter 114. A separate bank arbiter may also be contained in the arbiter 114.

The bank arbiter is a unit that contains read and write queues for each memory bank 104A-104N. The core arbiter arbitrates requests from the master cores 102A-102N, and fills them into the bank queues 116A-116N. The depth of the bank queues 116A-116N may also be fixed (e.g., 10 requests). Each bank queue 116A-116N corresponds to a memory bank 104A-104N. Thus, in an eight bank system, there are a total of eight write queues and eight read queues, and both master and bank queues. One could set the system up to have separate read and write queues or have combined read and write queues.

The access scheduler 118 is responsible for scheduling access to the memory banks 104A-104N for each cycle. The access scheduler 118 looks at the read and write queues for each memory bank 104A-104N and forms an access pattern that is the most efficient. The access scheduler 118 can prioritize requests at the head of each queue, but in the case of coded memory systems, the access scheduler 118 can look ahead in the queue to maximize accesses per cycle. The write queues may hold the writes until the writes are full. The reads can be given priority over the writes until the write queue is full.

Figure 6:
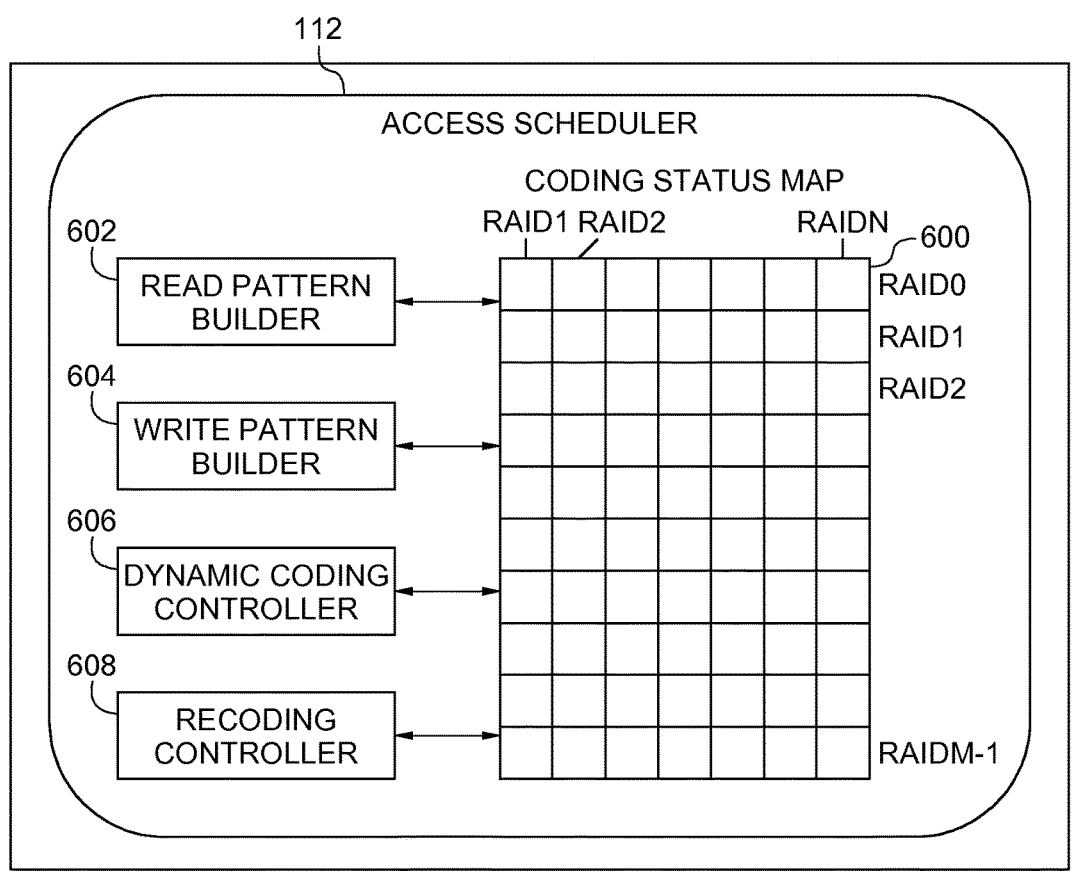
FIG. 6 is a block diagram illustrating an access scheduler, in accordance with an example embodiment, in more detail.

FIG. 6 is a block diagram illustrating an access scheduler 118, in accordance with an example embodiment, in more detail. A coding status map 600 may have rows corresponding to rows of memory banks and columns corresponding to memory banks. A code value may be placed in each cell of the coding status map 600 indicating the status of codes for each row in a particular memory bank. For example, if each cell holds two bits, 00 may indicate that codes are up-to-date, 01 may indicate that codes are outdated but that fresh data is in the memory bank, 10 may indicate that codes are outdated but that fresh data is in the coding bank, and 11 may be reserved.

Figure 7:
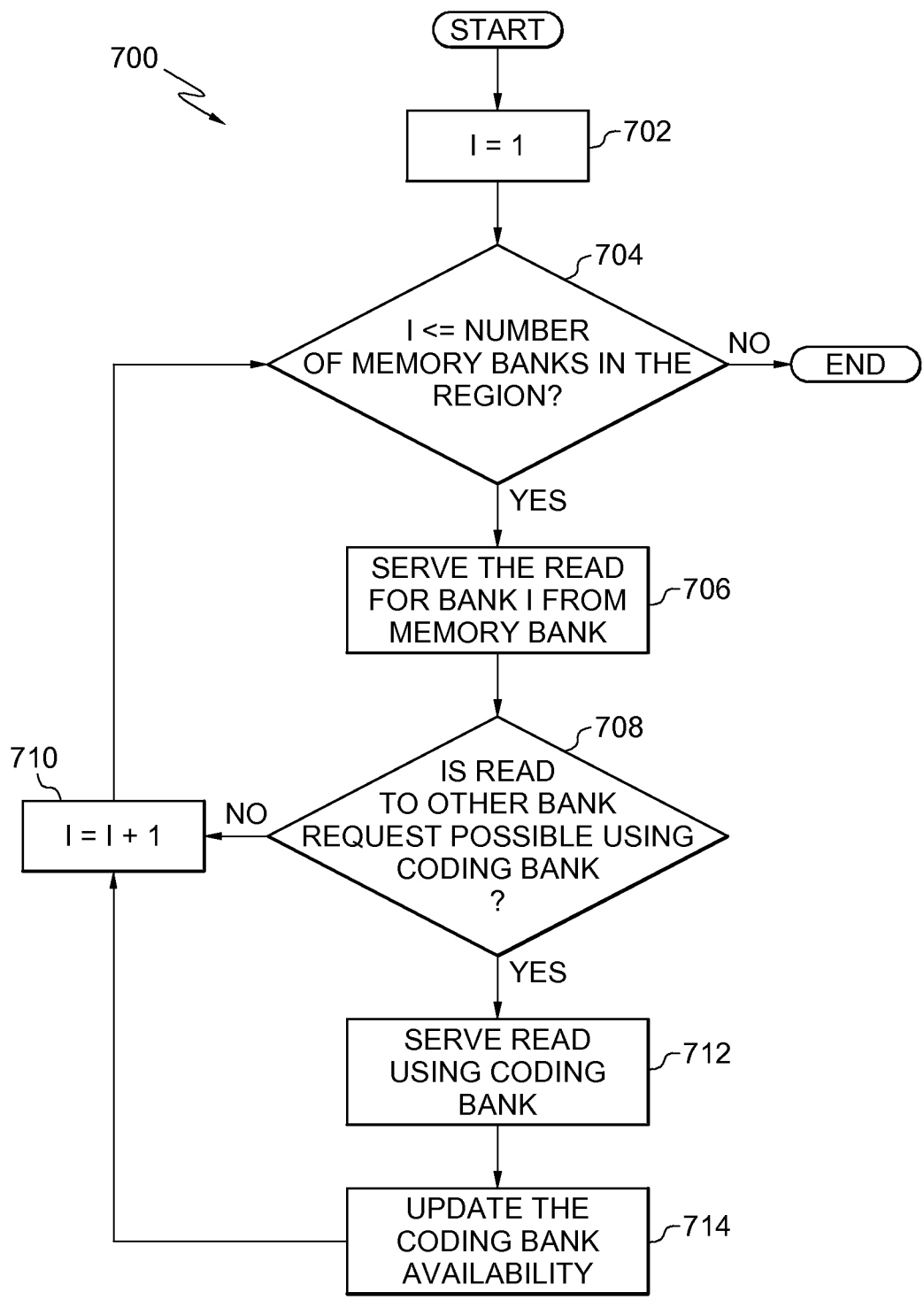
FIG. 7 is a flow diagram illustrating a method of handling a read request, in accordance with an example embodiment.

For a read request, a read pattern builder 602 is used to service the request. The focus of a read pattern builder 602 is to use the redundancy in the coding banks to serve more accesses. FIG. 7 is a flow diagram illustrating a method 700 of handling a read request in accordance with an example embodiment. At operation 702, a variable i is set to 1. At operation 704, it is determined if i is less than or equal to the number of memory banks in the region. If not, then the method 700 may end. If so, then at operation 706 the read is served for bank i from the memory bank. At operation 708, it is determined if a read to another bank request possible using a coding bank. If not, then at operation 710 i is incremented by 1. If so, then at operation 712 the read is served using the coding bank. Then at operation 714 the coding bank availability is updated. Then the method 700 proceeds to operation 710. After operation 710, the method 700 loops to operation 704.

Figure 8:
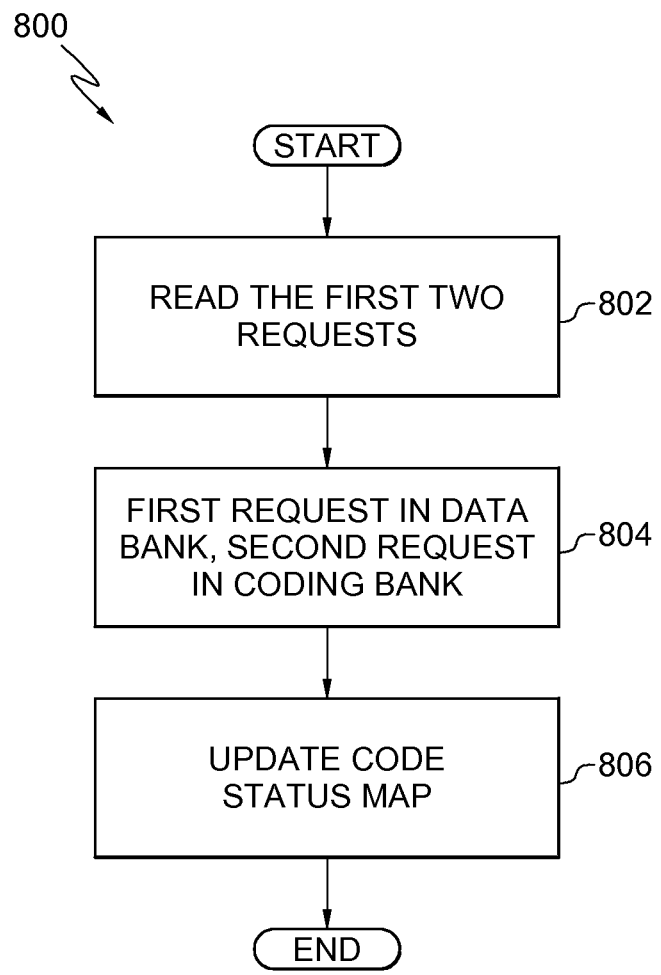
FIG. 8 is a flow diagram illustrating a method of handling a write request, in accordance with an example embodiment.

Write requests are fulfilled by a write pattern builder 604 in the access scheduler 112. As described above, in an example embodiment, the coded system performs 2 writes per bank per cycle by using the coding banks. When a write is scheduled for a particular bank, the scheduler picks up 2 requests from the head of the queue. It writes the first request to the corresponding memory bank. The second write is committed to the coding bank of the respective row where this particular write data is being used in this coding bank. FIG. 8 is a flow diagram illustrating a method 800 of handling a write request in accordance with an example embodiment. At operation 802, the first two requests are read from the write queue. At operation 804, the first request is served by the corresponding memory bank while the second request is served by the corresponding coding bank. At operation 806, the code status map is updated. For elements stored to the memory bank, the code may be updated to 01, while for elements stored to the coding bank, the code may be updated to 10.

A dynamic coding controller 606 in the access scheduler 112 is responsible for maintaining codes for heavily accessed memory sub regions. This block primarily helps in the reduction of code storage for unused memory. An algorithm may be provided that identifies a current heavily accessed region and indicates to the controller that the region should be coded. In this manner, only a portion of the whole memory needs to be coded.

The conflicts in memory accesses from various cores occur mostly when the accesses are to shared memory, especially when they are localized to certain memory regions. The locality of the memory accesses over a period of time can be explored to reduce the memory overhead for storing the codes. In a multi-core system, when various cores try to work from a shared memory location, the cores tend to generate accesses to a localized region of memory. This motivates the idea of coding the localized region during the period of heavy access, and dynamically changing the region whenever there is a change in the locality of memory accesses.

In an example embodiment, the currently coded region changes when the access pattern changes. That is, the localized memory area that is most heavily accessed can change, and then the system recodes the new localized access region using a recoding controller 608. In an example embodiment, dynamic coding is accomplished by dividing the memory into subregions and keeping track of accesses in the subregions. Once the number of accesses to a particular subregion reaches a particular threshold, this subregion is assigned as the currently coded area. A window concept may be used. The system maintains a table of subregions such as [Starting Address, Length]. Each subregion is thus given a starting address and length. Any access to a particular subregion is considered a hit. The system has a hit counter associated with each of the subregions which is incremented for each hit.

The system makes a decision of coding a particular subregion based on its hit counter value. The number of coded subregions at a particular time is based on the subregion size and the code storage size. The eviction of a coded region follows a Least Recently Used (LRU) policy similar to that used for a cache. The block implements a simple logic to determine heavy access to a particular region. It divides the whole memory into subregions. The memory can be divided dynamically with the provision of the following window parameters: [StartAddress, Length]. The controller can have multiple window parameters with the constraint that the total length should be less than the available memory for code storage. This would allow the system designer to have small chunks of distributed memory to be coded. The codes described are obtained by linear combination of data elements of the same row in various memory banks. The window parameter for an address primarily signifies the row start.

The dynamic coding controller 606 resets the count of accesses to the subregions at the switch of the subregion. The new counts determine the next change of the coded subregion.

Figure 9:
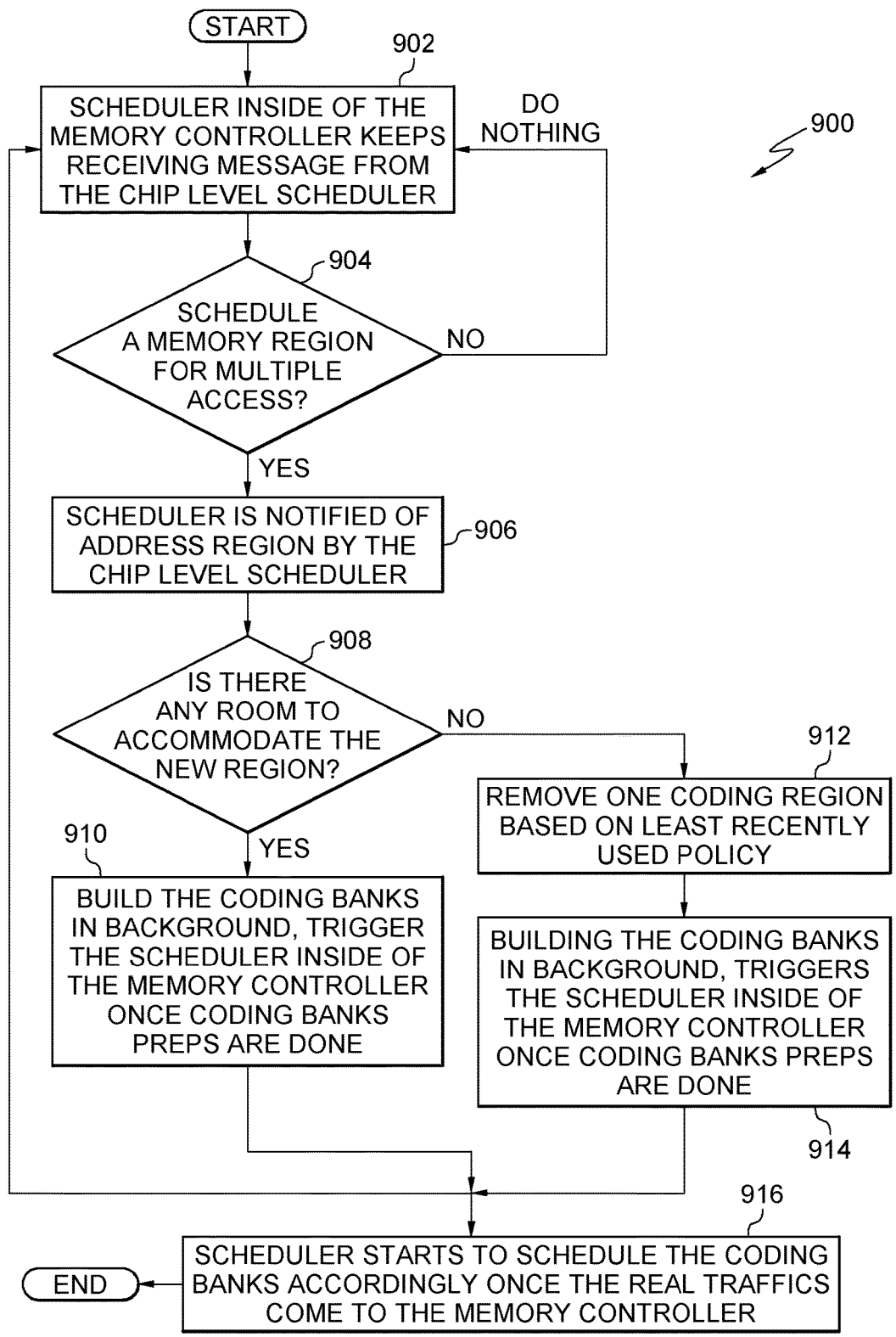
FIG. 9 is a flow diagram illustrating a method for assigning buffers into memory, in accordance with an example embodiment.

FIG. 9 is a flow diagram illustrating a method 900 for assigning buffers into memory in accordance with an example embodiment. At operation 902, the access scheduler receives messages from a chip-level scheduler indicating a desire to assign buffers. At operation 904, it is determined if a memory region corresponding to the buffer is scheduled for multiple accesses. If not, then nothing is done. If so, then at operation 906 the chip-level scheduler informs the access scheduler of the address region to be used. At operation 908, it is determined if there is any room to accommodate the new region. If so, then at operation 910 coding banks are built in the background, and when done, the access scheduler is informed. If there is not any room to accommodate the new data, then at operation 912 one coding region is removed based on an LRU policy. Then the method 900 proceeds to operation 910.

At operation 916, the access scheduler schedules the coding banks accordingly once access requests are received by the memory controller.

Figure 10:
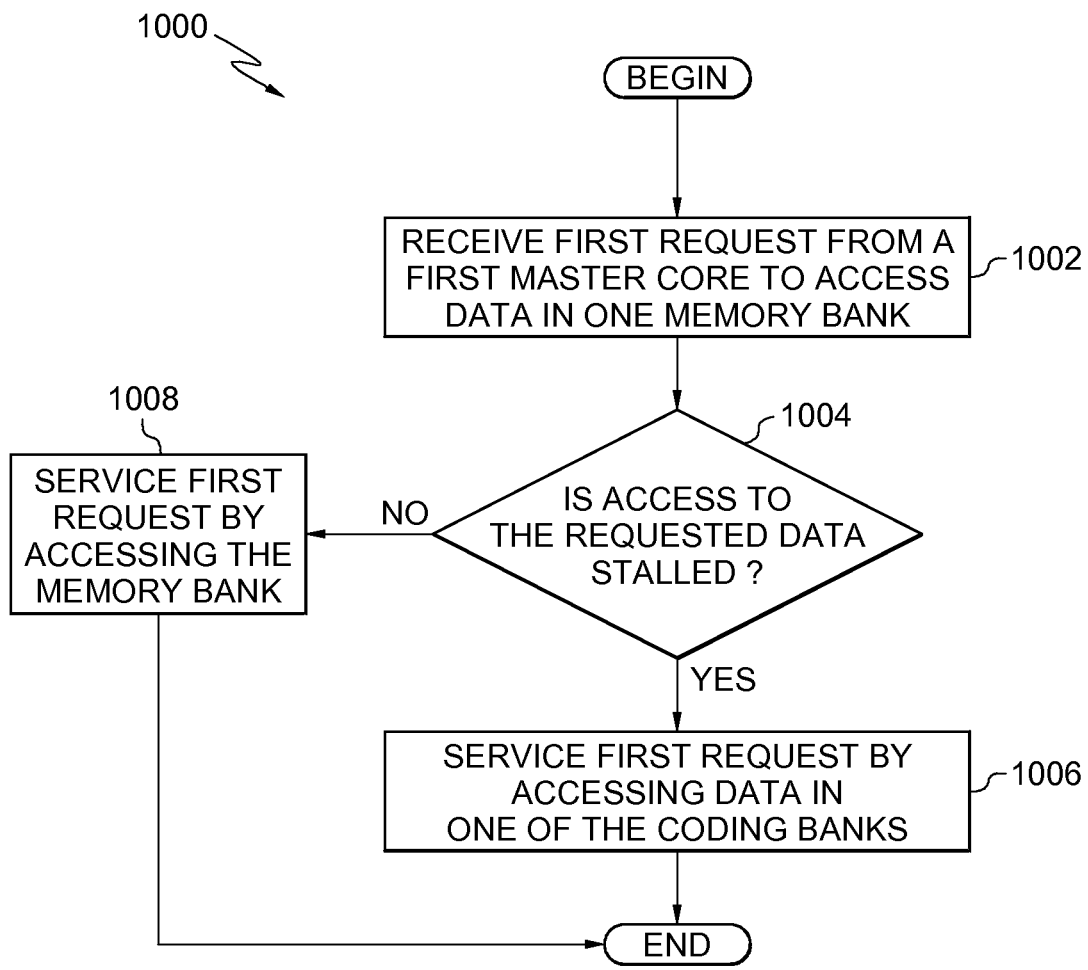
FIG. 10 is a flow diagram illustrating a method for scheduling and preparing a group of coding banks, in accordance with an example embodiment.

FIG. 10 is a flow diagram illustrating a method 1000 for scheduling and preparing a group of coding banks in accordance with an example embodiment. At operation 1002, a first request is received, from a first master core, to access data in one of a plurality of memory banks. At operation 1004, it is determined whether an access to the requested data is stalled by virtue of a second request, from a second master core, to access the data in the one of the plurality of memory banks currently being serviced. If so, then at operation 1006, the first request is serviced by accessing the data in one of a plurality of coding banks, each coding bank smaller in size than each memory bank. If not, then at operation 1008, the first request is serviced by accessing the data in the one of the memory banks.

While the present disclosure describes embodiments that can be used in any type of computing device, in some example embodiments implementation at a wireless base station such as a Long-Term Evolution (LTE), Global System for Mobile Applications (GSM) or Universal Mobile Telecommunications System (UMTS) base stations is utilized. In LTE, these base stations are also known as Evolved Node Bs (eNBs).

Other embodiments such as mobile devices and other types of computing devices are also foreseen.

Example Mobile Device

Figure 11:
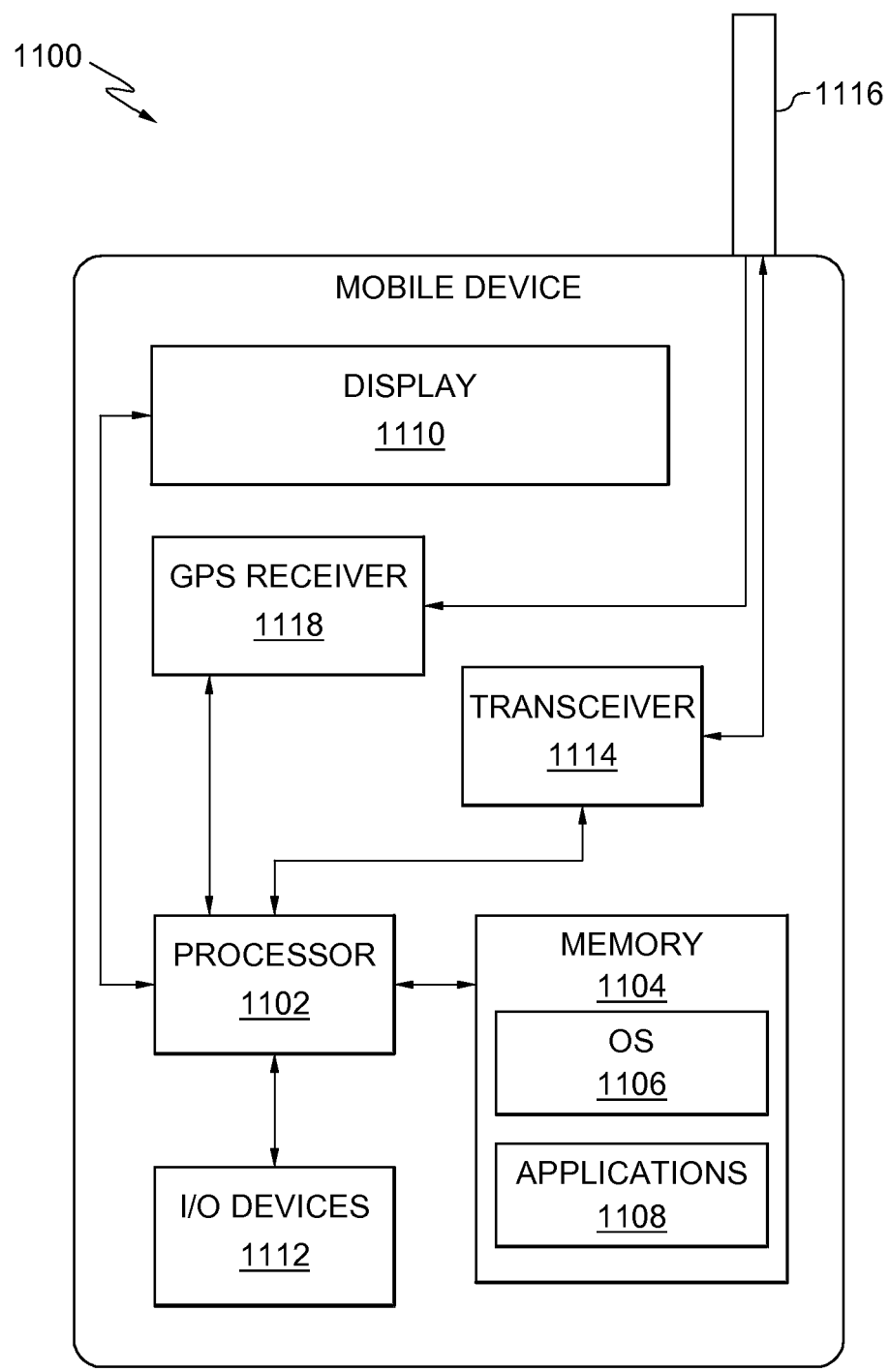
FIG. 11 is a block diagram illustrating a mobile device, according to an example embodiment.

FIG. 11 is a block diagram illustrating a mobile device 1100, according to an example embodiment. The mobile device 1100 can include a processor 1102. The processor 1102 can be any of a variety of different types of commercially available processors 1102 suitable for mobile devices 1100 (for example, an XScale architecture microprocessor, a microprocessor without interlocked pipeline stages (MIPS) architecture processor, or another type of processor 1102). A memory 1104, such as a random access memory (RAM), a flash memory, or another type of memory, is typically accessible to the processor 1102. The memory 1104 can be adapted to store an operating system (OS) 1106, as well as application programs 1108. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 1102 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 1102 or other programmable processor 1102) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1102 configured using software, the general-purpose processor 1102 can be configured as different hardware-implemented modules at different times. Software can accordingly configure a processor 1102, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 1102 that are temporarily configured (e.g., by software) or permanently configured to perform the relevant operations. Whether temporarily or permanently configured, such processors 1102 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 1102 or processor-implemented modules. The performance of certain of the operations can be distributed among the one or more processors 1102, not only residing within a single machine, but deployed across a number of machines. In some example embodiments, the processor 1102 or processors 1102 can be located in a single location (e.g., within a home environment, an office environment, or a server farm), while in other embodiments, the processors 1102 can be distributed across a number of locations.

The one or more processors 1102 can also operate to support performance of the relevant operations in a "cloud computing" environment or as a "software as a service" (SaaS). For example, at least some of the operations can be performed by a group of computers (as examples of machines including processors 1102), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 1102, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 1102 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 1102), or in a combination of permanently and temporarily configured hardware can be a design choice. Below are set out hardware (e.g., machine) and software architectures that can be deployed, in various example embodiments.

Example Machine Architecture and Machine-Readable Medium

Figure 12:
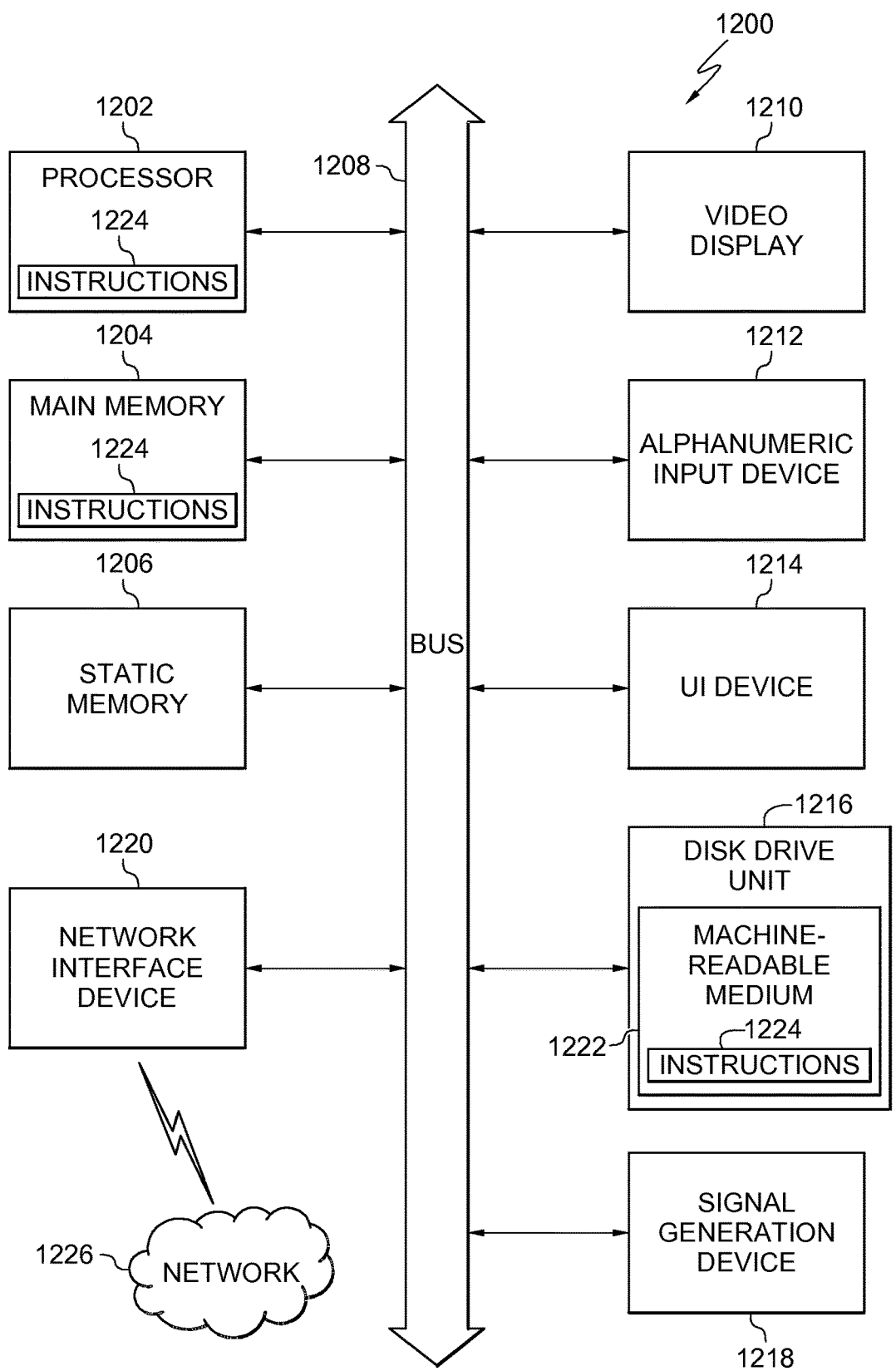
FIG. 12 is a block diagram of machine in the example form of a computer system within which instructions can be executed for causing the machine to perform any one or more of the methodologies discussed herein.

FIG. 12 is a block diagram of machine in the example form of a computer system 1200 within which instructions 1224 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions 1224 to perform any one or more of the methodologies discussed herein.

The example computer system 1200 includes a processor 1202 (e.g., a CPU, a graphics processing unit (GPU), or both), a main memory 1204, and a static memory 1206, which communicate with each other via a bus 1208. The computer system 1200 can further include a video display 1210 (e.g., a liquid crystal display (LCD) or a cathode ray tube (CRT)). The computer system 1200 also includes an alphanumeric input device 1212 (e.g., a keyboard or a touch-sensitive display screen), a cursor control device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of instructions 1224 (e.g., software) embodying or utilized by any one or more of the methodologies or functions described herein. The instructions 1224 can also reside, completely or at least partially, within the main memory 1204 and/or within the processor 1202 during execution thereof by the computer system 1200, the main memory 1204 and the processor 1202 also constituting machine-readable media 1222.

While the machine-readable medium 1222 is shown in an example embodiment to be a single medium, the term "machine-readable medium" can include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1224 can further be transmitted or received over a communications network 1226 using a transmission medium. The instructions 1224 can be transmitted using the network interface device 1220 and any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 1224 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This DETAILED Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Various combinations of the features described above may be implemented in individual example embodiments. For example, the lookahead process described above may be implemented in systems where the requests are processed in parallel, the data in one or more coding banks is coded such that servicing a first request includes decoding the data by obtaining at least one other piece of data from the memory banks and using the at least one other piece of data to decode the data, the coding banks are coded via an Exclusive OR (XOR) operation, or any combination thereof. Additionally, the system in any of these embodiments may be implemented as a wireless base station.

Furthermore, the embodiment described above with regards to the interleaving of data in the one of the plurality of coding banks with data from a data bank may be combined with embodiments in which the data is coded such that the servicing of a first request includes decoding the data by obtaining at least one other piece of data from the memory banks and using the at least one other piece of data to decode the data. Additionally, the lookahead process can be combined with any of these embodiments.

What is claimed is:

1. A system comprising:
   a plurality of master core processors;
   a plurality of memory banks;
   one or more coding banks, each of the one or more coding banks being smaller than each of the plurality of memory banks;
   a plurality of bank queues that queue requests for the memory banks;
   an arbiter coupled between the master core processors and the bank queues to receive requests from the master core processors and provide the requests to the bank queues; and
   an access scheduler coupled between the bank queues, the memory banks, and the one or more coding banks to process the requests such that a conflicting request serviceable by the one or more coding banks is provided to the one or more coding banks,
   wherein data in the one or more coding banks is coded such that servicing a first request includes decoding the data by obtaining at least one other piece of data from the memory banks and using the at least one other piece of data to decode the data.

2. The system of claim 1, wherein coded data in the one of the coding banks is coded via an Exclusive OR (XOR) operation.

3. The system of claim 1, wherein the system is located in a wireless base station.

4. The system of claim 3, wherein the wireless base station is a Long-Term Evolution (LTE) base station.

5. A system comprising:
a plurality of master core processors;
a plurality of memory banks;
one or more coding banks, each of the one or more coding banks being smaller than each of the plurality of memory banks;
a plurality of bank queues that queue requests for the memory banks;
an arbiter coupled between the master core processors and the bank queues to receive requests from the master core processors and provide the requests to the bank queues; and
an access scheduler coupled between the bank queues, the memory banks, and the one or more coding banks to process the requests such that a conflicting request serviceable by the one or more coding banks is provided to the one or more coding banks,
wherein the arbiter is configured to load data in the one or more coding banks using a lookahead process on requests stored in the bank queues.

6. The system of claim 5, wherein the arbiter is further configured to fill and update codes for writes via a background process.

7. A system comprising:
a plurality of master core processors;
a plurality of memory banks;
one or more coding banks, each of the one or more coding banks being smaller than each of the plurality of memory banks;
a plurality of bank queues that queue requests for the memory banks;
an arbiter coupled between the master core processors and the bank queues to receive requests from the master core processors and provide the requests to the bank queues; and
an access scheduler coupled between the bank queues, the memory banks, and the one or more coding banks to process the requests such that a conflicting request serviceable by the one or more coding banks is provided to the one or more coding banks,
wherein the processing the requests include processing the requests in parallel to allow parallel access to information from a memory bank via a plurality of coding banks, and wherein data is coded in the coding banks using an interbank coding means.

8. A system comprising:
a plurality of master core processors;
a plurality of memory banks;
one or more coding banks, each of the one or more coding banks being smaller than each of the plurality of memory banks;
a plurality of bank queues that queue requests for the memory banks;
an arbiter coupled between the master core processors and the bank queues to receive requests from the master core processors and provide the requests to the bank queues; and
an access scheduler coupled between the bank queues, the memory banks, and the one or more coding banks to process the requests such that a conflicting request serviceable by the one or more coding banks is provided to the one or more coding banks,
wherein the processing the requests include processing the requests in parallel to allow parallel access to information from a memory bank via a plurality of coding banks, and wherein data is coded in the coding banks using an intrabank coding means.

9. A system comprising:
a plurality of master core processors;
a plurality of memory banks;
one or more coding banks, each of the one or more coding banks being smaller than each of the plurality of memory banks;
a plurality of bank queues that queue requests for the memory banks;
an arbiter coupled between the master core processors and the bank queues to receive requests from the master core processors and provide the requests to the bank queues; and
an access scheduler coupled between the bank queues, the memory banks, and the one or more coding banks to process the requests such that a conflicting request serviceable by the one or more coding banks is provided to the one or more coding banks,
wherein the processing the requests include processing the requests in parallel to allow parallel access to information from a memory bank via a plurality of coding banks, and wherein data is coded in the coding banks using a combination of an intrabank coding means and an interbank coding means.

* * * * *